(12) United States Patent
Koenig et al.

(10) Patent No.: US 8,048,267 B2
(45) Date of Patent: Nov. 1, 2011

(54) RECORDING SHEET WITH IMPROVED IMAGE WATERFASTNESS, SURFACE STRENGTH, AND RUNNABILITY

(75) Inventors: Michael F Koenig, Loveland, OH (US); Kapil M Singh, West Chester, OH (US)

(73) Assignee: International Paper Company, Memphis, TN (US)

( * ) Notice: Subject to any disclaimer, the term of this patent is extended or adjusted under 35 U.S.C. 154(b) by 700 days.

(21) Appl. No.: 12/154,342

(22) Filed: May 21, 2008

(65) Prior Publication Data

US 2008/0289786 A1 Nov. 27, 2008

Related U.S. Application Data

(60) Provisional application No. 60/931,163, filed on May 21, 2007.

(51) Int. Cl.
*D21H 19/16* (2006.01)
*D21H 21/18* (2006.01)

(52) U.S. Cl. .............. 162/135; 162/158; 162/164.1; 162/164.3; 162/168.1; 162/168.3; 162/175; 162/181.1; 162/181.2; 428/32.21; 428/32.26; 428/32.28; 428/32.29; 428/32.3

(58) Field of Classification Search .......... 162/135, 162/158, 164.1, 164.3, 164.6, 168.1, 168.2, 162/175, 181.1, 181.2; 428/32.21, 32.26, 428/32.28, 32.29, 32.3
See application file for complete search history.

(56) References Cited

U.S. PATENT DOCUMENTS

| | | |
|---|---|---|
| 4,022,965 A | 5/1977 | Goheen et al. |
| 4,075,136 A | 2/1978 | Schaper |
| 4,166,894 A | 9/1979 | Schaper |
| 4,169,810 A | 10/1979 | Gunther et al. |
| 4,174,417 A | 11/1979 | Rydell |
| 4,251,824 A | 2/1981 | Hara et al. |
| 4,410,899 A | 10/1983 | Haruta et al. |
| 4,412,224 A | 10/1983 | Sugitani |
| 4,425,405 A | 1/1984 | Murakami et al. |
| 4,431,481 A | 2/1984 | Drach et al. |
| 4,446,174 A | 5/1984 | Maekawa et al. |
| 4,478,910 A | 10/1984 | Oshima et al. |
| 4,481,244 A | 11/1984 | Haruta et al. |
| 4,496,427 A | 1/1985 | Davison |
| 4,496,629 A | 1/1985 | Haruta et al. |
| 4,503,118 A | 3/1985 | Murakami et al. |
| 4,517,244 A | 5/1985 | Kobayashi et al. |
| 4,532,530 A | 7/1985 | Hawkins |
| 4,554,181 A | 11/1985 | Cousin et al. |
| 4,576,867 A | 3/1986 | Miyamoto |
| 4,601,777 A | 7/1986 | Hawkins et al. |
| 4,636,409 A | 1/1987 | Arai et al. |
| 4,740,420 A | 4/1988 | Akutsu et al. |
| 4,792,487 A | 12/1988 | Schubring et al. |
| 4,830,911 A | 5/1989 | Kojima et al. |
| 4,877,680 A | 10/1989 | Kakaki et al. |
| 4,908,240 A | 3/1990 | Auhorn et al. |
| 4,986,882 A | 1/1991 | Mackey et al. |
| 5,013,603 A | 5/1991 | Ogawa et al. |
| 5,049,235 A | 9/1991 | Barcus et al. |
| 5,160,789 A | 11/1992 | Barcus et al. |
| 5,163,973 A | 11/1992 | Ellis |
| 5,190,805 A | 3/1993 | Atherton et al. |
| 5,209,953 A | 5/1993 | Grupe et al. |
| 5,266,250 A | 11/1993 | Kroyer |
| 5,270,103 A | 12/1993 | Oliver et al. |
| 5,314,747 A | 5/1994 | Malhotra et al. |
| 5,320,902 A | 6/1994 | Malhotra et al. |
| 5,360,420 A | 11/1994 | Cook et al. |
| 5,397,619 A | 3/1995 | Kuroyama et al. |
| 5,405,678 A | 4/1995 | Bilodeau |
| 5,429,860 A | 7/1995 | Held et al. |
| 5,443,899 A | 8/1995 | Barcus et al. |
| 5,457,486 A | 10/1995 | Malhotra et al. |
| 5,474,843 A | 12/1995 | Lambert et al. |
| 5,482,514 A | 1/1996 | von Raven |
| 5,531,728 A | 7/1996 | Lash |
| 5,537,137 A | 7/1996 | Held et al. |
| 5,657,064 A | 8/1997 | Malhotra |
| 5,662,773 A | 9/1997 | Frederick et al. |
| 5,667,637 A | 9/1997 | Jewell et al. |
| 5,698,074 A | 12/1997 | Barcus et al. |
| 5,698,688 A | 12/1997 | Smith et al. |
| H1704 H | 1/1998 | Wallajapet et al. |
| 5,729,266 A | 3/1998 | Malhotra |
| 5,760,809 A | 6/1998 | Malhotra et al. |

(Continued)

FOREIGN PATENT DOCUMENTS

EP 1524279 4/2005

(Continued)

OTHER PUBLICATIONS

JP abstract, filed Jun. 8, 2006.

*Primary Examiner* — Eric Hug
*Assistant Examiner* — Peter Chin
(74) *Attorney, Agent, or Firm* — Thomas W. Barnes, III; Eric W. Guttag

(57) ABSTRACT

The present invention relates to a sizing or coating composition that, when applied to paper substrate, creates a substrate having improved waterfastness, surface strength, and surface strength as measured by resistance to abrasion. In addition, the present invention relates to paper substrates containing the composition, as well as methods of using and making the paper substrate and composition.

21 Claims, 3 Drawing Sheets

U.S. PATENT DOCUMENTS

| | | | |
|---|---|---|---|
| 5,902,454 | A | 5/1999 | Nelson |
| 6,146,494 | A | 11/2000 | Seger et al. |
| 6,160,789 | A | 12/2000 | Abraham |
| 6,361,651 | B1 | 3/2002 | Sun |
| 6,426,382 | B1 | 7/2002 | Farrar et al. |
| 6,471,824 | B1 | 10/2002 | Jewell |
| 6,506,282 | B2 | 1/2003 | Hu et al. |
| 6,579,414 | B2 | 6/2003 | Jewell |
| 6,579,415 | B2 | 6/2003 | Jewell |
| 6,582,557 | B2 | 6/2003 | Jewell |
| 6,592,717 | B2 | 7/2003 | Jewell |
| 6,660,348 | B2 * | 12/2003 | Cuch et al. ................. 428/32.34 |
| 6,723,846 | B1 | 4/2004 | Metzger et al. |
| 6,761,941 | B2 * | 7/2004 | Kobayashi et al. ........ 428/32.26 |
| 6,764,726 | B1 | 7/2004 | Yang et al. |
| 6,890,454 | B2 | 5/2005 | Farrar et al. |
| 6,893,473 | B2 | 5/2005 | Neogi et al. |
| 7,060,201 | B2 | 6/2006 | Farrar |
| 2003/0013628 | A1 | 1/2003 | Farrar et al. |
| 2004/0014910 | A1 | 1/2004 | Wang |
| 2004/0209014 | A1 * | 10/2004 | Mandai et al. ............. 428/32.28 |
| 2005/0020729 | A1 | 1/2005 | Renz et al. |
| 2005/0083386 | A1 | 4/2005 | Samaanyake et al. |
| 2007/0193707 | A1 | 8/2007 | Nguyen |
| 2008/0289786 | A1 | 11/2008 | Koenig et al. |

FOREIGN PATENT DOCUMENTS

| | | |
|---|---|---|
| EP | 1775141 | 4/2007 |
| EP | 1593698 | 6/2007 |
| JP | 2006-142748 | 6/2006 |
| WO | 9600221 | 1/1996 |
| WO | WO 03/054030 | 7/2003 |
| WO | 2003092913 | 11/2003 |
| WO | WO 2006/057290 | 6/2006 |
| WO | 2007053681 | 5/2007 |
| WO | 2008039562 | 4/2008 |

* cited by examiner

FIG.4 WATERFASTNESS (% CHANGE)

ABRASION

RECORDING SHEET WITH IMPROVED IMAGE WATERFASTNESS, SURFACE STRENGTH, AND RUNNABILITY

The present application claims the benefit of priority under 35 USC §119(e) to U.S. Provisional Patent Application 60/931,163, filed May 21, 2007, which is hereby incorporated, in its entirety, herein by reference.

BACKGROUND OF THE INVENTION

1. Field of the Invention

The present invention relates to a sizing or coating composition that, when applied to paper substrate, creates a substrate having improved waterfastness, surface strength, and surface strength as measured by resistance to abrasion. In addition, the present invention relates to paper substrates containing the composition, as well as methods of using and making the paper substrate and composition. In particular, the substrate may be printed via inkjet printing methodologies (including dye and pigment inks) and/or may be printed via inkjet and offset printing methodologies (e.g. a dual use paper is possible in some instances).

2. Prior Art

Recording sheets are known. See for example U.S. Pat. Nos. 6,764,726; 5,270,103; 5,657,064; 5,760,809; 5,729,266; 4,792,487; 5,405,678; 4,636,409; 4,481,244; 4,496,629; 4,517,244; 5,190,805; 5,320,902; 4,425,405; 4,503,118; 5,163,973; 4,425,405; 5,013,603; 5,397,619; 4,478,910; 5,429,860; 5,457,486; 5,537,137; 5,314,747; 5,474,843; 4,908,240; 5,320,902; 4,740,420; 4,576,867; 4,446,174; 4,830,911; 4,554,181; and 4,877,680, all of which are hereby incorporated in their entirety by reference.

However, conventional paper substrates such as those above remain poor in balancing waterfastness, surface strength and runnability, especially if used as a dual purpose sheet for both offset and inkjet (dye and/or pigment-based) recording. Accordingly, there is a need to provide such high-performance and functionality to paper substrates.

DETAILED DESCRIPTION OF THE INVENTION

Figure 1:
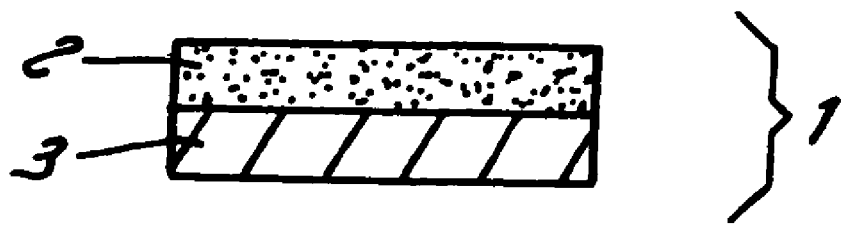
FIG. 1: A first schematic cross section of just one exemplified embodiment of the paper substrate that is included in the paper substrate of the present invention.

The present inventors have discovered a composition that, when applied to a web of cellulosic fibers, creates a paper substrate having improved waterfastness, surface strength and runnability. This substrate may be used with inkjet printing (dye or ink-based) alone, or may be used as a dual purpose sheet for both offset and inkjet (dye and/or pigment-based) recording. Thus the substrate of the present invention may be used as a recording sheet for inkjet printing alone or for dual purpose offset/inkjet printing.

The composition may contain a solvent such as water and at least one binder. Examples of binders include, but are not limited to starch, polyvinyl alcohol, polyvinylamine, alginate, carboxymethyl cellulose. Examples of starches include, for example, oxidized, cationic, ethylated, hydroethoxylated, etc. Further, the starch may be of any type, including but not limited to oxidized, ethylated, cationic and pearl, and is preferably used in aqueous solution. Illustrative of useful starches for the practice of this preferred embodiment of the invention are naturally occurring carbohydrates synthesized in corn, tapioca, potato and other plants by polymerization of dextrose units. All such starches and modified forms thereof such as starch acetates, starch esters, starch ethers, starch phosphates, starch xanthates, anionic starches, cationic starches and the like which can be derived by reacting the starch with a suitable chemical or enzymatic reagent can be used in the practice of this invention.

Useful starches may be prepared by known techniques or obtained from commercial sources. For example, the suitable starches include PG-280 from Penford Products, SLS-280 from St. Lawrence Starch, the cationic starch CatoSize 270 from National Starch and the hydroxypropyl No. 02382 from Poly Sciences, Inc.; CatoSize 270 and KoFilm 280 (all from National Starch) and PG-280 ethylated starches and AP Pearl starches.

When polyvinyl alcohol is utilized, polyvinyl alcohol (PVOH) may be produced by hydrolyzing polyvinyl acetate (PVA). The acetate groups are replaced with alcohol groups and the higher the hydrolysis indicates that more acetate groups have been replaced. Lower hydrolysis/molecular weight PVOH are less viscous and more water soluble. While the PVOH may have any % hydrolysis, the PVOH may have, for example, a % hydrolysis ranging from 100% to 75%.

The composition may contain any amount of binder, including from 70 wt % to 99 wt %, from 80 wt % to 98 wt %, and from 85 wt % to 96 wt %, based upon the total weight of the solids in the composition. The composition may contain 70, 75, 78, 80, 82, 84, 85, 86, 88, 90, 92, 94, 95, 96, 97, 98 and 99 wt % of the binder based upon the total weight of the solids in the composition, including any and all ranges and subrange therein.

The composition may also contain at least one dye fixative. Examples of dye fixatives include nitrogen containing compounds. The nitrogen containing compound may be inorganic or organic, preferably organic. Suitable nitrogen containing compounds, oligomers and polymers are those containing one or more quaternary ammonium functional groups. Such functional groups may vary widely and include substituted and unsubstituted amines, imines, amides, urethanes, quaternary ammonium groups, dicyandiamides and the like. Illustrative of such materials are polyamines, polyethyleneimines, copolymers of diallyldimethyl ammonium chloride (DADMAC), copolymers of vinyl pyrrolidone (VP) with quaternized diethylaminoethylmethacrylate (DEAMEMA), polyamides, cationic polyurethane latex, cationic polyvinyl alcohol, polyalkylamines dicyandiamide copolymers, amine glycigyl addition polymers, poly[oxyethylene (dimethyliminio) ethylene (dimethyliminio)ethylene]dichlorides, and polyguanides such as poly(hexamethylene biguanide). While the nitrogen containing compound may have any molecular weight, the molecular weight may be equal to or less than 100,000 daltons, preferably equal to or less than about 50,000 and more preferably less than about 10,000. The molecular weight may be 100, 200, 500, 1000, 2000, 3000, 5000, 10000, 250000, 50000, and 100000, including any and all ranges and subranges therein. Illustrative of such materials are polyalkylamine dicyandiamide copolymers, poly[oxyethylene(dimethyliminio)ethylene(dimethyliminioethylene] dichlorides and polyamines. Other examples include low molecular weight cationic polymers such as polyalkylamine dicyandiamide copolymer, poly[oxyethylene (dimethyliminio)ethylene(dimethyliminio)ethylene]dichloride. Still further, the nitrogen containing compounds include low molecular weight polyalkylamine dicyandiamide copolymers. Examples of modified poly(vinyl alcohol)-co-poly(vinyl amine) polymers with cationic functional groups attached thereto are also useful nitrogen containing species, such as those found in US published patent application U.S.2005/0020729 and PCT application WO2003054030, which are both hereby incorporated in their entirety by reference. Examples of cationic latex polymers that are included as nitrogen containing species are those found in US published patent application U.S.2005/0020729, which is hereby incorporated in its entirety by reference. Further examples of dye fixatives are those found in U.S. Pat. No. 6,764,726, which is hereby incorporated in its entirety by reference, as well as those commercially available as Bubond 60 from Buckman that has a molecular weight of 2,000 Daltons.

In one embodiment, the dye fixative may be used in combination with an optical brightening agents, such as for example in a complex. Such complexes may, for example, be formed via covalently bonding the dye fixative to the optical brightening agent. Optical brightening agents ("OBAs") used in the practice of the process of this invention may vary widely and any conventional OBA used or which can be used to brighten mechanical or Kraft pulp can be used in the combination with the dye fixative. Optical brighteners are dye-like fluorescent compounds which absorb the short-wave ultraviolet light not visible to the human eye and emit it as longer-wave blue light, with the result that the human eye perceives a higher degree of whiteness and the degree of whiteness is thus increased. This provides added brightness and can offset the natural yellow cast of a substrate such as paper. Optical brighteners used in the present invention may vary widely and any suitable optical brightener may be used. An overview of such brighteners is to be found, for example, in Ullmann's Encyclopedia of Industrial Chemistry, Sixth Edition, 2000 Electronic Release, OPTICAL BRIGHTENERS—Chemistry of Technical Products which is hereby incorporated, in its entirety, herein by reference. Other optical brighteners are described in U.S. Pat. Nos. 5,902,454; 6,723,846; 6,890,454; 5,482,514; 6,893,473; 6,723,846; 6,890,454; 6,426,382; 4,169,810; and 5,902,454 and references cited therein which are all incorporated by reference. Still other optical brighteners are described in U.S. Pat. Application Publication Nos. U.S. 2007/0193707; U.S. 2004/014910 and U.S. 2003/0013628; and WO 96/00221 and of which are hereby incorporated, in their entirety, herein by reference. Illustrative of useful optical brighteners are 4,4'-bis-(triazinylamino)-stilbene-2,2'-disulfonic acids, 4,4'-bis-(triazol-2-yl) stilbene-2,2'-disulfonic acids, 4,4'-dibenzofuranyl-biphenyls, 4,4'-(diphenyl)-stilbenes, 4,4'-distyryl-biphenyls, 4-phenyl-4'-benzoxazolyl-stilbenes, stilbenzyl-naphthotriazoles, 4-styryl-stilbenes, bis-(benzoxazol-2-yl) derivatives, bis-(benzimidazol-2-yl) derivatives, coumarins, pyrazolines, naphthalimides, triazinyl-pyrenes, 2-styryl-benzoxazole or -naphthoxazoles, benzimidazole-benzofurans or oxanilides.

Most commercially available optical brightening agents are based on stilbene, coumarin and pyrazoline chemistries and these are preferred for use in the practice of this invention. More preferred optical brighteners for use in the practice of this invention are optical brighteners typically used in the paper industry based on stilbene chemistry such as 1,3,5-triazinyl derivatives of 4,4'-diaminostilbene-2,2'-disulfonic acid and salts thereof, which may carry additional sulfo groups, as for example at the 2, 4 and/or 6 positions. Stilbene derivatives as for example those commercially available from Ciba Geigy under the tradename "Tinopal", from Clariant under the tradename "Leucophor", from Lanxess under the tradename "Blankophor", and from 3V under the tradename "Optiblanc" such as disulfonate, tetrasulfonate and hexasulfonate stilbene based optical brightening agents. Of course, if the dye fixative is covalently attached to OBAs having similar chemistries as those mentioned above, the OBA chemistry may change from anionic to cationic in nature, such as a cationic stilbene-based OBA. An example of a dye fixative that is in the form of a complex with an OBA or that may also act as an OBA is that which is commercially available from Clariant as Leucophor FTS. Further examples of such dye fixative/OBA dual function compounds and/or formulations include those when the OBA is cationic rather than anionic. Still further, examples can be found in U.S. Pat. Nos. 7,060,201 and 6,890,454, which is hereby incorporated, in its entirety, herein by reference.

The composition may contain any amount of the nitrogen containing compound, including from 0.01 to 10 wt %, from 0.1 to 7 wt %, from 0.5 to 6 wt %, and from 1 wt % to 6 wt %, based upon the total dry weight of the starch in the composition. The composition may contain 0.01, 0.05, 0.1, 0.5, 1.0, 1.5, 2.0, 2.5, 3.0, 3.5, 4.0, 4.5, 5.0, 6.0, 7.0, 8.0, 9.0, and 10.0 wt % of the binder based upon the total dry weight of the starch in the composition, including any and all ranges and subrange therein.

The composition may also contain a crosslinking agent. The crosslinking agent may be any chemical that is capable of crosslinking the hydroxyl groups of starch and/or the functional groups of the dye fixative. The crosslinking agent may be formaldehyde, urea, formaldehyde/urea resins, melamine, formaldehyde/melamine resins, acid anhydrides, maleic anhydride, anhydrides, metal salts, boron-containing compounds, boron containing salts, metal containing boron compounds, borates, sodium borate, ammonium salts, zirconium salts, AZT, glyoxal, blocked glyoxal such as those commercially available from Clariant (known as Cartbond TSI). Examples of blocked glyoxals are those that have the reactive groups either sterically or chemically blocked so that such groups may not react until a temperature of the compound is reached. While this temperature could be any temperature, in some circumstances the temperature could be greater than 150° Farenheit or even at least 160° Farenheit.

The composition may contain any amount of the nitrogen containing compound, including from 0.01 to 7 wt %, from 0.1 to 5 wt %, from greater than 0.5 to 4 wt %, and from 1 wt % to 3 wt %, based upon the total dry weight of the starch in the composition. The composition may contain 0.01, 0.05, 0.1, 0.5, 1.0, 1.5, 2.0, 2.5, 3.0, 3.5, 4.0, 4.5, 5.0, 6.0, 7.0, 8.0, 9.0, and 10.0 wt % of the binder based upon the total dry weight of the starch in the composition, including any and all ranges and subrange therein.

The composition may optionally contain at least one inorganic salt. Suitable inorganic salts may be monovalent and/or divalent and/or trivalent and may contain any level of hydration complexes thereof. Exemplified inorganic salts are those from Groups 1, 2 and 13 from the Periodic Table of Elements and hydrated complexes thereof, including monohydrates, dihydrates, trihydrates, tetrahydrates, etc. The cation of the salt may be sodium, calcium, magnesium, and aluminum preferably. The anionic counterion to the cation of the inorganic salt may be any counterion. Examples of the counterion include organic counterions, phosphate, sulfates, and halogens such as chloride, boride, fluoride, etc and/or hydroxyl group(s). The most preferred inorganic salts being sodium chloride and/or calcium chloride. When the inorganic salt is optionally present, it may be present at any amount, including from 1 to 50 wt % and from 8 to 37 wt %, based upon the total dry weight of the starch. The inorganic salt may be 1, 5, 8, 10, 15, 20, 25, 30, 35, 36, 37, 38, 39, 40, 42, 45, 47, and 50 wt %, including any and all ranges and subranges therein.

Further optional components that may be present in the composition include pigment, dispersants, fluorescent dyes, surfactants, deforming agents, preservatives, pigments, binders, pH control agents, coating releasing agents, and the like.

The composition may be contacted with a web of cellulosic fibers to make a paper substrate of the present invention. The fibers may be synthetic. Examples of synthetic fibers may be those made from polyolefin fibers. Such synthetic fibers are commercially available as for example from DuPont under the trademark "Tyvex". The fibers may be recycled fibers and/or virgin fibers. Recycled fibers differ from virgin fibers in that the fibers have gone through the drying process at least once. The sources of the fibers are from softwood and/or hardwood. Further, the softwood and/or hardwood fibers contained by the paper substrate of the present invention may be modified by physical and/or chemical means. Examples of physical means include, but is not limited to, electromagnetic and mechanical means. Means for electrical modification include, but are not limited to, means involving contacting the fibers with an electromagnetic energy source such as light and/or electrical current. Means for mechanical modification include, but are not limited to, means involving contacting an inanimate object with the fibers. Examples of such inanimate objects include those with sharp and/or dull edges. Such means also involve, for example, cutting, kneading, pounding, impaling, etc means. Examples of chemical means include, but is not limited to, conventional chemical fiber modification means. Examples of such modification of fibers may be, but is not limited to, those found in the following U.S. Pat. Nos. 6,592,717, 6,582,557, 6,579,415, 6,579,414, 6,506, 282, 6,471,824, 6,361,651, 6,146,494, H1,704, 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, which are hereby incorporated in their entirety by reference.

The substrate of the present invention contains an effective amount of the above-described composition and/or components within the composition. An effective amount of the composition and/or components within the composition may be applied to the web of cellulosic fibers. An effective amount is meant to be the amount necessary to achieve a good balance of waterfastness, surface strength, and runnability as described below.

Although the effective amount of the composition could be any amount to obtain any one or more of the below-described performance and/or physical characteristics of the substrate, it is preferable that an effective amount of the composition is added such that the paper substrate contains from 50 to 150 lbs of starch per ton of web. The amount of starch may be 50, 60, 70, 80, 90, 100, 110, 120, 130, 140, and 150 lbs/ton of paper, including any and all ranges and subranges therein. In addition, it is preferably that an effective amount of the composition is added such that the paper substrate contains from 0.1 to 15 lbs of dye fixative per ton of web. The amount of dye fixative may be 0.1, 0.2, 0.5, 1, 1.5, 2, 2.5, 3, 3.5, 4, 4.5, 5, 5.5, 6, 7, 8, 9, 10, 11, 12, 13, 14, and 15 lbs/ton of web, including any and all ranges and subranges therein. In addition, it is preferably that an effective amount of the composition is added such that the paper substrate contains from 0.01 to 15 lbs of crosslinker per ton of web. The amount of crosslinker may be 0.01, 0.02, 0.05, 0.08, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.2, 2.5, 2.8, 3.0, 3.2, 3.5, 4.0, 4.5, 5, 6, 7, 8, 9, 10, 11, 12, 13, 14, and 15 lbs/ton of web, including any and all ranges and subranges therein.

The substrate may have one or more improved properties that enhance the image waterfastness of recording sheets formed from the substrate. Although there are many ways to measure waterfastness, we describe the waterfastness test referred to within this document hereinbelow. It should be noted that the test described below is very similar to ASTM test F2292-03, which is hereby incorporated in its entirety by reference. Of course, any differences will be noted.

If a solid color is printed on a sheet or paper and the printed section is immersed into water, some ink will dissolve into the water leaving the remaining image faded or less dark. The density (darkness) of the printed solid can be measured with an optical densitomer both before and after immersion into water. The difference between the density readings can be expressed as the density loss ("DL %"). The method involves printing solid colored stripes on paper, immersing one-half of the stripe into deionized water at 23° C. for 60 seconds, and then air drying the paper. The optical density is read on the immersed ($OD_W$) and non-immersed ($OD_O$) portions of the stripe by a reflectance densitometer (X-Rite, Macbeth. Etc.). The percent density loss ("DL %") is defined as DL %=[($OD_W$−$OD_O$/$OD_O$]×100. In this equation, a positive DL % indicates a density increase after water immersion. While we do not wish to be bound by any theory, it is believed that this density increase is done to ink dye redistribution which provides for a more uniform ink coverage. A negative DL % is believed to indicate that the ink dye is washed out after the sample is subjected to water immersion and is undesirable. Preferably, the DL % is from about −10% to about 15%. More preferably, the DL % is from about −5% to about 15%. Most preferably, the DL % is from about 0% to about 15%. The DL % may be −10, −7, −5, −3, 0, 3, 5, 7, 10, 12, and 15%, including any and all ranges and subranges therein.

The substrate may have enhanced the surface strength. An example of enhanced surface strength is enhanced resistance to abrasion as measured by Taber Abrasion according to standard Tappi Test T 476 om-06, which is hereby incorporated in its entirety by reference. The Taber Abrasion may be any amount, including less than about 75, less than about 60, less than 50, and less than 40 mg/1000 revolutions. The Taber Abrasion may be less than about 75, 70, 65, 60, 55, 50, 45, 40, 35, 30, 25, 20 15, 10, and 5 mg/1000 revolutions, including any and all ranges and subranges therein.

The substrate may have enhanced runnability. An example of enhanced runnability is exemplified by testing to see how many standard rolls of substrate (standard rolls are 36 inches wide, 50 inches in diameter, and having a 3 inch core) may be printed with the offset press mentioned below using the chemicals and conditions mentioned below:

| | |
|---|---|
| Press | RDP Drent Goebel 4 color press |
| Press speed | 1300 fpm on first roll, then 1400 fpm on all others |
| Fountain solution | Prisco H8P + |
| PH of Fountain solution | 3.7 |
| Concentration of fountain solution | 4 oz. per gallon |

-continued

| | |
|---|---|
| Temperature setting (AWS system) | 60° F. |
| Conductivity gauge | 1800 mmhos at start |
| Inks | Zeller-Gmellin UVAlux |
| Sequence | 1st print unit - off (no impression cylinder) |
| | 2nd print unit - off (no impression cylinder) |
| | 3rd print unit - Bright Red - pre-mix PMS 186 |
| | 4th print unit - standard Black |
| Plates | Fuji Barilla positive |
| Blankets | Day 9500 3 ply |
| room atmospheric conditions | 68° F. and 32% Relative Humidity |

The Test is to see how many standard rolls will run through the press before the offset printer plates must be replaced or cleaned due to contamination thereof and/or deposits from substrate attached thereto the plates. Using this test, the substrate of the present invention, when placed in standard rolls, may run for greater than half of a standard roll, preferably greater than one standard roll, more preferably at least two standard rolls, and most preferably at least three standard rolls before offset printer plates must be replaced or cleaned due to contamination thereof and/or deposits from substrate attached thereto the plates. Conventional substrates, when tested according to the above, are not capable of running for greater than a half of a standard roll, and usually greater than 1 roll before offset printer plates must be replaced or cleaned due to contamination thereof and/or deposits from substrate attached thereto the plates.

The paper substrate of the present invention may have any black optical print density as measured by TAPPI METHOD T 1213 sp-03. The black optical density may be from 0.8 to 2.0, more preferably from 1.9 to 1.5. The black optical density may be 0.8, 0.9, 1.0, 1.05, 1.06, 1.07, 1.08, 1.09, 1.10, 1.11, 1.12, 1.13, 1.14, 1.15, 1.16, 1.17, 1.18, 1.19, 1.2, 1.3, 1.4, and 1.5, including any and all ranges and subranges therein.

The Hercules Sizing Test Value ("HST") of the substrate may be any HST. The HST is measured using the procedure of TAPPI 530 pm-89. In the preferred embodiments of this invention, the HST is preferably from about 1 second to about 400 seconds, including from 1 to 200 seconds, less than 100 seconds, less than 50 seconds, and less than 10 seconds. The HST may be 1, 2, 3, 4, 5, 6, 7, 8, 9, 10, 11, 12, 13, 14, 15, 20, 25, 30, 35, 40, 45, 50, 60, 70, 80, 90, 100, 125, 150, 175, 200, 225, 250, 275, 300, 325, 350, 375, and 400 seconds, including any and all ranges and subranges therein.

The substrate can be of any basis weight, including from 10 to 40 lbs/1300 ft$^2$, 15 to 30 lbs/1300 ft$^2$, 18-28 lbs/1300 ft$^2$, and about 20 and 24 lbs/1300 ft$^2$. The basis weight may be 10, 15, 18, 19, 20, 21, 22, 23, 24, 25, 26, 27, 28, 29, 30, 35, and 40 lbs/1300 ft$^2$, including any and all ranges and subranges therein.

The substrate can be of any density, including from 0.5 to 1.0, from 0.6 to 0.9, from 0.65 to 0.85, and from 0.7 to 0.8 g/cm$^3$. The density may be 0.5, 0.55, 0.6, 0.65, 0.7, 0.72, 0.74, 0.75, 0.76, 0.78, 0.8, 0.85, 0.9, 0.95 and 11.0 g/cm$^3$, including any and all ranges and subranges therein.

This composition of the present invention may be added internally or to a surface of the web of cellulosic fibers to make the substrate of the present invention. Surface application is preferable. Examples of surface applications a size press and/or coater. The size press may be any size press commonly known in the art. For example, the size press may be a puddle mode size press (e.g. inclined, vertical, horizontal) or metered size press (e.g. blade metered, rod metered), etc. The coater may be any coater commonly known in the art. For example, the coater may be a blade coater or air knife coater, a bar coater, Meyer rod coater, reverse roll coater, extrusion coater, a gravure or reverse-gravure coater, a curtain coater, a dip coater, and a spray coater, etc.

Figure 2:
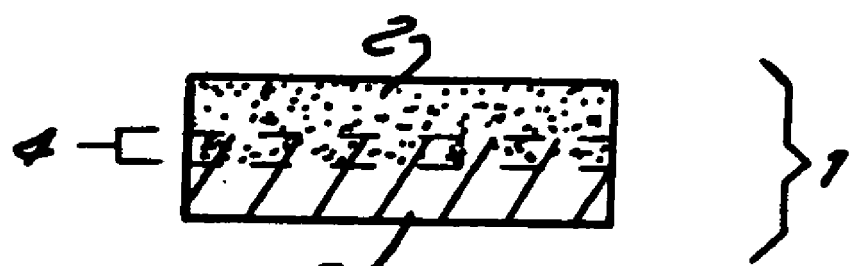
FIG. 2: A second schematic cross section of just one exemplified embodiment of the paper substrate that is included in the paper substrate of the present invention.
Figure 3:
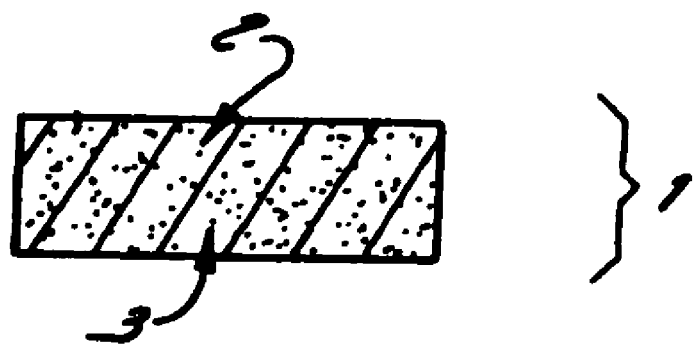
FIG. 3: A third schematic cross section of just one exemplified embodiment of the paper substrate that is included in the paper substrate of the present invention.

FIGS. 1-3 demonstrate different embodiments of the paper substrate 1 in the paper substrate of the present invention. FIG. 1 demonstrates a paper substrate 1 that has a web of cellulose fibers 3 and a composition 2 where the composition 2 has minimal interpenetration of the web of cellulose fibers 3. Such an embodiment may be made, for example, when a composition is coated onto a web of cellulose fibers.

FIG. 2 demonstrates a paper substrate 1 that has a web of cellulose fibers 3 and a composition 2 where the composition 2 interpenetrates the web of cellulose fibers 3. The interpenetration layer 4 of the paper substrate 1 defines a region in which at least the composition penetrates into and is among the cellulose fibers. The interpenetration layer may be from 1 to 99% of the entire cross section of at least a portion of the paper substrate, including 1, 2, 5, 10, 15, 20, 25, 30, 35, 40, 45, 50, 55, 60, 65, 70, 75, 80, 85, 90, 95, and 99% of the paper substrate, including any and all ranges and subranges therein. Such an embodiment may be made, for example, when a composition is added to the cellulose fibers prior to a coating method and may be combined with a subsequent coating method if required. Addition points may be at the size press, for example.

FIG. 3 demonstrates a paper substrate 1 that has a web of cellulose fibers 3 and a solution 2 where the composition 2 is approximately evenly distributed throughout the web of cellulose fibers 3. Such an embodiment may be made, for example, when a composition is added to the cellulose fibers prior to a coating method and may be combined with a subsequent coating method if required. Exemplified addition points may be at the wet end of the paper making process, the thin stock, and the thick stock.

The paper substrate may be made by contacting any component of the composition with the cellulose fibers consecutively and/or simultaneously. Still further, the contacting may occur at acceptable concentration levels that provide the paper substrate of the present invention to contain any of the above-mentioned amounts of cellulose and components of the sizing solution. The contacting may occur anytime in the papermaking process including, but not limited to the thick stock, thin stock, head box, size press and coater. Further addition points include machine chest, stuff box, and suction of the fan pump. Preferably, the components of the composition are preformulated either together and/or in combination within a single and/or separate coating layer(s) and coated onto the fibrous web via a size press and/or coater.

When the composition is applied to the web of cellulosic fibers, especially at a size press, the amount of composition applied thereto may be from 1 to 300 dry lbs/ton of web, including from 50 to 150, from 75 to 125, and from 80 to 100 dry lbs/ton of web. The amount of composition that is applied to the web may be 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 125, 130, 140, 150, 160, 170, 180, 190, 200, 225, 250, 275, and 300 dry lbs/ton of web, including any and all ranges and subranges therein.

In one embodiment, the binder may be applied via a size press at typical sizing amounts to create a sized web. Then, a coater may apply a composition containing the dye fixative and/or the crosslinking agent at the same time or sequentially. In this case, the coater may place any amount of dye fixative and/or crosslinking agent to the sized web, including from 0.25 to 25, 0.5 to 10, and 1.5 to 5 dry lbs/ton of web. In this embodiment, the amount of dye fixative and/or crosslinking agent applied to the web may be 0.25, 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, 5, 6, 7, 8, 9, 10, 12, 15, 20 and 25 dry lbs/ton of web, including any and all ranges and subranges therein.

The paper or paperboard of this invention can be prepared using known conventional techniques. Methods and apparatuses for forming and making and applying a coating formulation to a paper substrate are well known in the paper and paperboard art. See for example, G. A. Smook referenced above and references cited therein all of which is hereby incorporated by reference. All such known methods can be used in the practice of this invention and will not be described in detail.

The essential one or more nitrogen containing organic species and one or more starches and optional components can be dissolved or dispersed in an appropriate liquid medium, preferably water, and can be applied to the substrate by any suitable technique.

Paper substrates of the present invention can be employed in ink jet printing processes. One embodiment of the present invention is directed to a process which comprises applying an aqueous recording liquid to a recording sheet of the present invention in an image wise pattern. Another embodiment of the present invention is directed to a printing process which comprises (1) incorporating into an ink jet printing apparatus containing an aqueous ink a recording sheet of the present invention, and (2) causing droplets of the ink (dye and/or pigment-based) to be ejected in an image wise pattern onto the recording sheet, thereby generating images on the recording sheet. Ink jet printing processes are well known, and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference. In a particularly preferred embodiment, the printing apparatus employs a thermal ink jet process wherein the ink in the nozzles is selectively heated in an imagewise pattern, thereby causing droplets of the ink to be ejected in imagewise pattern. The recording sheets of the present invention can also be used in any other printing or imaging process, such as printing with pen plotters, imaging with color laser printers or copiers, handwriting with ink pens, offset printing processes, or the like, provided that the toner or ink employed to form the image is compatible with the ink receiving layer of the recording sheet.

The present invention will be described with references to the following examples. The examples are intended to be illustrative and the invention is not limited to the materials, conditions, or process parameters set forth in the example. All parts and percentages are by unit weight unless otherwise indicated.

EXAMPLES

Example 1

(A) Preparation of Size Press Compositions

A series of size press compositions were prepared using the following procedure. The composition is prepared in the lab using a low shear mixer. A certain amount of pre-cooked starch is added to the mixing container, then the Bubond 60 or the Leucophor FTS dye fixatives, then the crosslinker which is diluted in the remaining water under proper shear actions. The desired solids for this application is in a range of 14 to 16% depending on the tolerance of the system to size press treatment viscosity, and the desired pickup. The compositions and specifications are set for the in the following Table 1.

TABLE 1

Size Press Compositions Tested

| Composition | Starch, Parts | Bubond Fixative, Parts | Crosslinker, Parts |
|---|---|---|---|
| 1 | 60 | 0 | 0 |
| 2 | 60 | 2.5 | 0 |
| 3 | 60 | 2.5 | 0.5 |
| 4 | 60 | 2.5 | 1.0 |
| 5 | 60 | 2.5 | 1.5 |
| 6 | 60 | 2.5 | 2.0 |

B. Size Press Treatment

A base paper that was manufactured at Pensacola mill, paper machine P5, which did not have any size press application and a basis weight of about 75 g/m$^2$ was used in this study. The HST values was about 1 second. The base paper was coated with the coating compositions of Table 1 using a lab scale puddle size press. To apply the coating formulation, a 12" wide roll of paper substrate is continuously fed between two rollers, and the coating formulation is pumped into the nip reservoir, the paper being fed through the nip reservoir at a prefixed speed. By controlling the formulation solids, nip pressure, and size press running speed, the desired pickup weights mentioned in Table 1 were achieved. The amounts are provided in units of ?

Figure 4:
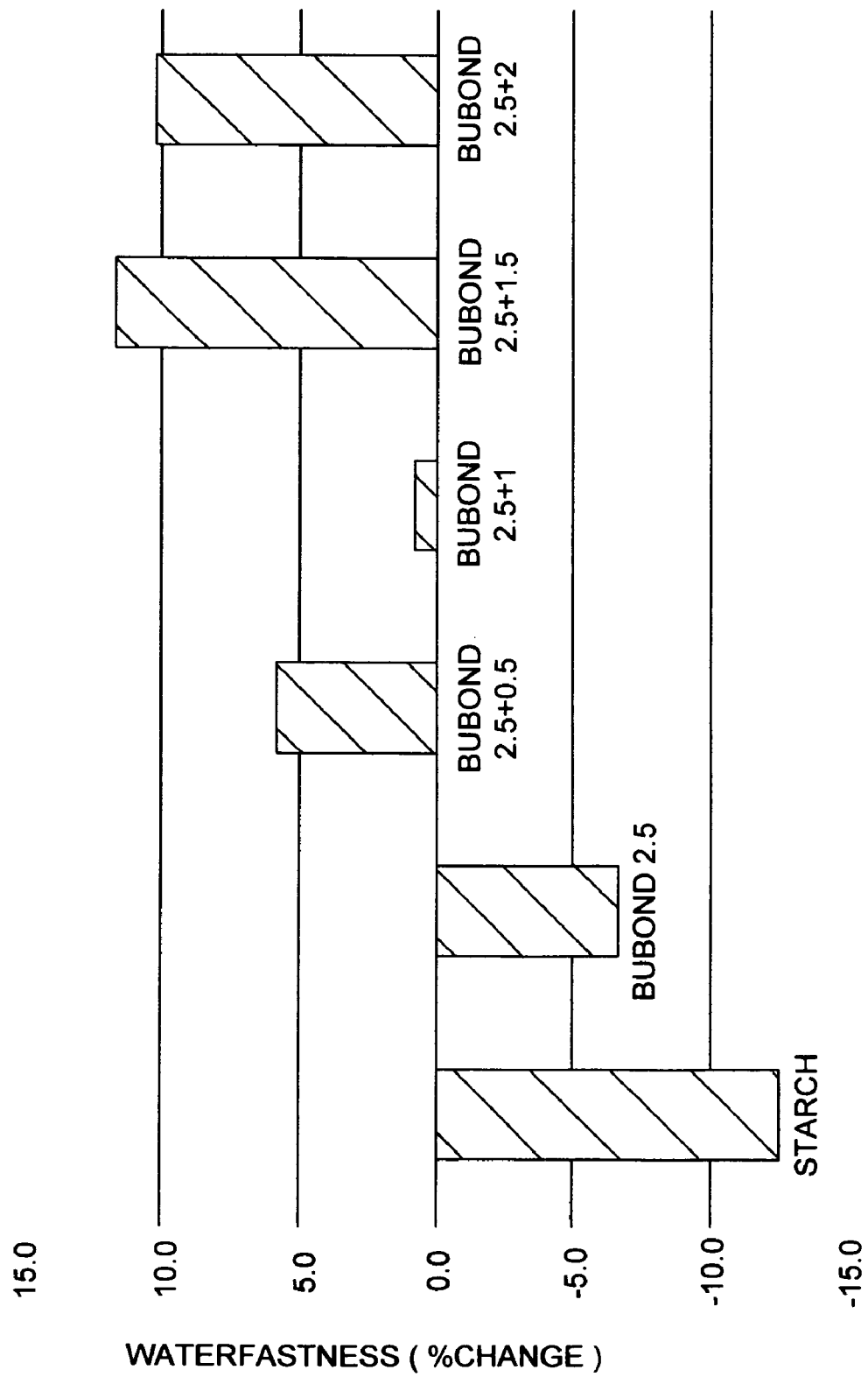
FIG. 4: A bar graph demonstrating that the present invention has improved waterfastness.
Figure 5:
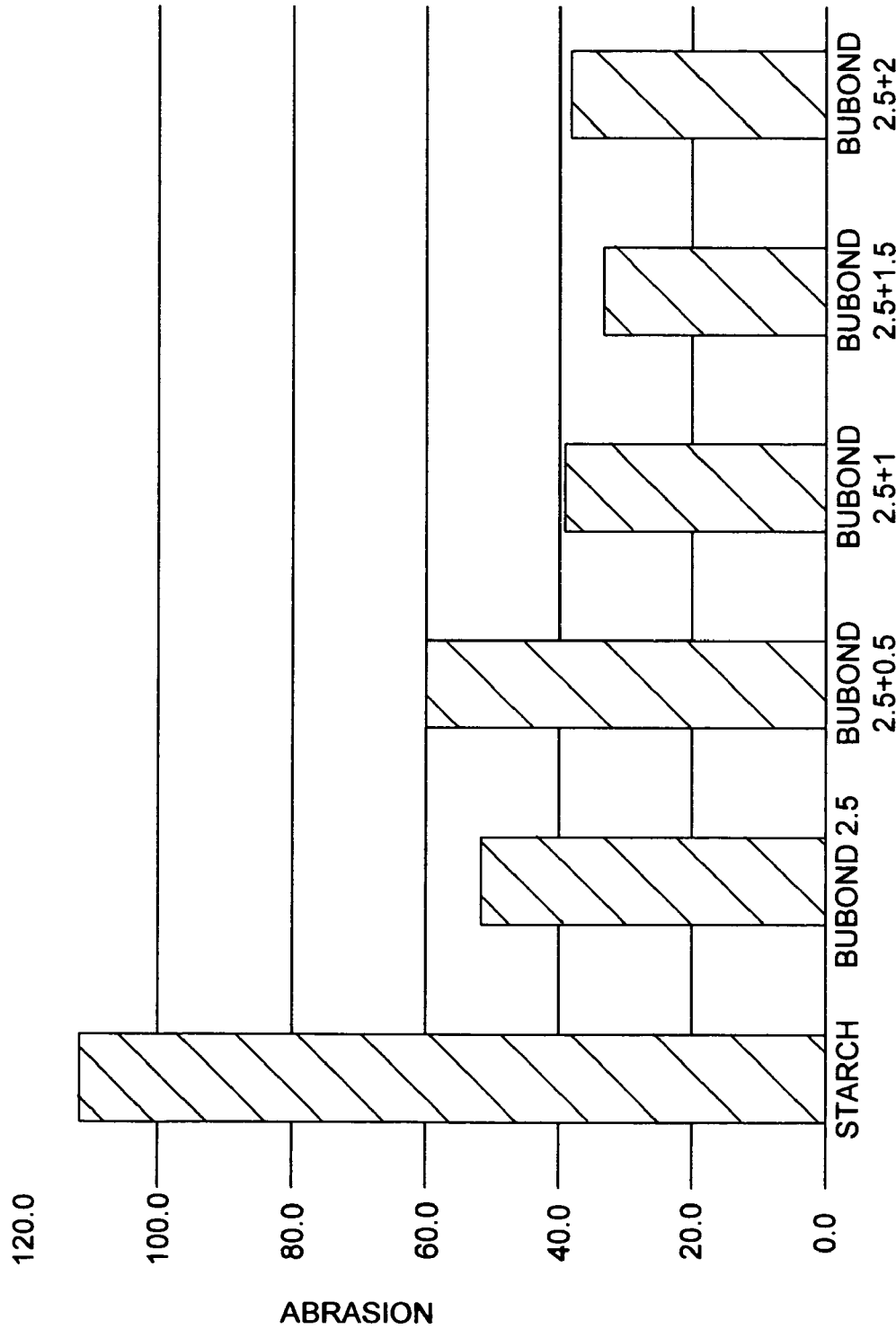
FIG. 5: A bar graph demonstrating that the present invention has improved surface strength as measured by abrasion resistance.

The waterfastness and abrasion tests were performed on each of the above samples of Table I. The results of each test are found in FIGS. 4 and 5, respectively. Print density is measured using a reflectance densitometer (X-Rite, Macbeth. Etc.) in units of optical density ("OD"). The method involves printing a solid block of color on the sheet, and measuring the optical density. There is some variation in OD depending on the particular printer used and the print mode chosen, as well as the densitometer mode and color setting. The printer used in this patent is a Scitex 4.5" wide printhead, which is connected to a microcomputer to determine the print pattern to print. The paper is attached to a drum which can spin at various speeds to simulate a printing press operating at different paper web speeds. The samples in this patent were printed at an equivalent web speed of 500 ft/min, using #1040 Scitex ink. The densitometer used was an X-Rite model 528 spectrodensitometer with a 6 mm aperture. The density measurement settings were Visual color, status T, and absolute density mode.

The waterfastness testing was performed by dipping the printed sample in room temperature water for one minute, and then removing the sample and allowing the sample to air dry. The print density was measured before and after dipping, and the % change in print density calculated. The Taber Wet Abrasion test was performed using the method described in Tappi standard T476.

Numerous modifications and variations on the present invention are possible in light of the above teachings. It is, therefore, to be understood that within the scope of the accompanying claims, the invention may be practiced otherwise than as specifically described herein.

As used throughout, ranges are used as a short hand for describing each and every value that is within the range, including all subranges therein.

All of the references, as well as their cited references, cited herein are hereby incorporated by reference with respect to relative portions related to the subject matter of the present invention and all of its embodiments

What is claimed is:

1. A paper substrate comprising a web of cellulosic fibers and having applied thereto a composition in an amount effective to impart to the substrate a waterfastness as measured by DL % of from −10 to 15, a surface strength that is less than 75 mg/1000 revolutions as measured by the Taber Abrasion test, and a runnability of such that the substrate, when in a roll that is 36 inches wide, 50 inches in diameter, and having a 3 inch core, runs continuously for greater than half of a total length of the roll, the composition comprising
at least one binder which has hydroxyl groups;
at least one dye fixative containing one or more quaternary ammonium functional groups; and
at least one crosslinking agent which is capable of crosslinking with the hydroxyl groups of the binder and the functional groups of the dye fixative.

2. The paper substrate according to claim 1, wherein the composition further comprises at least one pigment.

3. The paper substrate according to claim 1, wherein the composition further comprises at least one organic salt.

4. The paper substrate according to claim 1, wherein the at least one binder is present at an amount ranging from 85 to 98 wt % based upon the total weight of solids in the composition.

5. The paper substrate according to claim 1, wherein the at least one binder comprises starch, and wherein the at least one dye fixative is present at an amount ranging from 0.5 to 10 wt % based upon the total weight of starch in of the composition.

6. The paper substrate according to claim 1, wherein the at least one binder comprises starch, and wherein the at least one crosslinking agent is present at an amount ranging from 0.5 to 5 wt % based upon the total weight of starch in of the composition.

7. The paper substrate according to claim 1, wherein the at least one binder is at least one member selected from the group consisting of starch, modified starch, and polyvinyl alcohol.

8. The paper substrate according to claim 1, wherein the at least one dye fixative is at least one member selected from the group consisting of a polyamine, a polyeneimine, and an optical brightening agent:nitrogen-containing compound complex.

9. The paper substrate according to claim 1, wherein the at least one crosslinking agent is at least one member selected from the group consisting of glyoxal and blocked glyoxal.

10. The paper substrate according to claim 1, comprising
at least one binder comprising starch at an amount of 85 to 98 wt % based upon the total weight of solids in of the composition;
at least one dye fixative at an amount ranging from 0.5 to 10 wt % based upon the total weight of solids in of the composition; and
at least one crosslinking agent at an amount ranging from 0.25 to 5 wt % based upon the *total* weight of solids in of the *composition*.

11. The paper substrate according to claim 1, wherein:
the at least one binder is selected from the group consisting of starch and polyvinyl alcohol;
the at least one dye fixative is selected from the group consisting of a polyamine, a polyeneimine, and an optical brightening agent:nitrogen-containing compound complex; and
the at least one crosslinking agent is selected from the group consisting of glyoxal and blocked glyoxal.

12. The paper substrate according to claim 1, wherein the amount of the composition applied is effective to impart to the substrate has a waterfastness as measured by DL % of from −5 to 15.

13. The paper substrate according to claim 1, wherein the amount of the composition applied is effective to impart to the substrate a surface strength that is less than 60 mg/1000 revolutions as measured by the Taber Abrasion test.

14. The paper substrate according to claim 1, wherein the amount of the composition applied is effective to impart to the substrate a surface strength that is less than 50 mg/1000 revolutions as measured by the Taber Abrasion test.

15. The paper substrate according to claim 1, wherein the amount of the composition applied is effective to impart to the substrate a surface strength that is less than 40 mg/1000 revolutions as measured by the Taber Abrasion test.

16. The paper substrate according to claim 1, wherein the amount of the composition applied to the substrate is such that the substrate, when in a roll that is 36 inches wide, 50 inches in diameter, and having a 3 inch core, runs continuously for at least two lengths of the roll.

17. A method of making the paper substrate according to claim 1, comprising contacting the web of fibers with the composition at a size press or a coater.

18. The paper substrate according to claim 1, where the composition further comprises at least one inorganic salt comprising at least one cation selected from the group consisting essentially of calcium and magnesium.

19. The paper substrate according to claim 1, wherein:
the at least one binder comprises starch;
the at least one dye fixative comprises a cationic optical brightening agent; and
the at least one crosslinking agent is selected from the group consisting of glyoxal and blocked glyoxal.

20. The paper substrate according to claim 19, wherein the cationic optical brightening agent is a cationic stilbene-based optical brightening agent.

21. The paper substrate according to claim 1, wherein the crosslinking agent is selected from the group consisting of glyoxal, blocked glyoxal, borates, and acid anhydrides.

* * * * *